(12) United States Patent
Frach et al.

(10) Patent No.: US 8,481,948 B2
(45) Date of Patent: Jul. 9, 2013

(54) METHOD TO OPTIMIZE THE LIGHT EXTRACTION FROM SCINTILLATOR CRYSTALS IN A SOLID-STATE DETECTOR

(75) Inventors: Thomas Frach, Aachen (DE); Andreas Thon, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 13/203,990

(22) PCT Filed: Feb. 9, 2010

(86) PCT No.: PCT/IB2010/050584
§ 371 (c)(1),
(2), (4) Date: Aug. 31, 2011

(87) PCT Pub. No.: WO2010/109344
PCT Pub. Date: Sep. 30, 2010

(65) Prior Publication Data
US 2012/0001075 A1    Jan. 5, 2012

Related U.S. Application Data

(60) Provisional application No. 61/163,067, filed on Mar. 25, 2009.

(51) Int. Cl.
*G01T 1/20* (2006.01)
(52) U.S. Cl.
USPC .................. 250/362; 250/361 R; 250/394
(58) Field of Classification Search
USPC ....................................................... 250/362
See application file for complete search history.

(56) References Cited

U.S. PATENT DOCUMENTS

| | | |
|---|---|---|
| 2005/0046336 A1 | 3/2005 | Utsumi et al. |
| 2005/0129171 A1* | 6/2005 | Jiang et al. ........................ 378/19 |
| 2005/0167605 A1* | 8/2005 | Juni ........................... 250/370.11 |
| 2007/0237478 A1 | 10/2007 | D'Aguanno et al. |
| 2008/0054797 A1 | 3/2008 | Furugori |
| 2008/0129171 A1 | 6/2008 | Greiner |
| 2010/0219349 A1* | 9/2010 | Furuichi et al. ............... 250/366 |

FOREIGN PATENT DOCUMENTS

JP    60086480 A    5/1985

OTHER PUBLICATIONS

Wu, Y., et al.; One-dimensional heterostructural metallodielectric photonic band gap material for the modification of emission spectrum of BaF2 scintillator; 2004; Applied Physics Letters; 85(19)4337-4339.

* cited by examiner

*Primary Examiner* — Marcus Taningco

(57) ABSTRACT

A light transmitting element such as a scintillating element (50) or an optic fiber (50') has side surfaces coated with a metamaterial (62) which has an index of refraction less than 1 and preferably close to zero to light transmitted in the light transmitting element. A photonic crystal (80) or metamaterial layer optically couples a light output face of the light transmitting element with a light sensitive element (52), such as a silicon photomultiplier (SiPM). A thin metal layer (64) blocks optical communication between adjacent scintillating elements (50) in a radiation detector (22), such as a radiation detector of a nuclear imaging system (10).

21 Claims, 3 Drawing Sheets

US 8,481,948 B2

METHOD TO OPTIMIZE THE LIGHT EXTRACTION FROM SCINTILLATOR CRYSTALS IN A SOLID-STATE DETECTOR

CROSS REFERENCE TO RELATED APPLICATIONS

This application claims the benefit of U.S. provisional application Ser. No. 61/163,067 filed Mar. 25, 2009, which is incorporated herein by reference.

The present application relates to the radiation detection arts. It finds particular application in conjunction with positron emission tomography (PET) systems and will be described with particular reference thereto. It will be appreciated however, that it will also find application in conjunction with other nuclear imaging systems such as single positron emission computed tomography (SPECT) systems, and other indirect radiation detection systems which use scintillators.

Nuclear imaging systems typically include detectors which receive incident radiation and output an electrical signal in response to each incident radiation event. One common detector includes an array of scintillation crystals which are optically coupled to an array of photo detectors, such as solid-state or analog photomultipliers.

For higher resolution, the scintillation crystals and photo detectors are relatively small, with a cross-section commensurate with the resolution, and closely packed. In order to prevent light from one scintillation crystal from reaching a neighboring scintillation crystal and being channeled through it to a neighboring photo detector, relatively thin light opaque barriers are disposed between adjacent scintillation crystals. To optimize scintillator efficiency, the barrier is often light reflective, such that light which impinges upon side walls of the scintillation crystal is reflected back into the crystal and eventually to the photo detector. Examples of such reflective barriers might include a metal or metalized layer, such as aluminum, a reflective white paint, a Teflon™ layer, and the like. In the interface between the scintillation crystal and the photo detector, an optical coupling agent, such as optical grease, light pipe, or the like is typically applied to maximize the transfer of light.

Although much effort has been spent to improve the transmission of light to the photomultiplier or other light detector, transmission losses are typically on the order of 50% or more.

The present application contemplates a new and improved system and method which overcomes the above-referenced problems and others.

In accordance with one aspect, a light device is provided. The light device includes a light transmitting element and a light sensitive element optically coupled to a light output face of the light transmitting element. A metamaterial having an index of refraction less than 1 is disposed on one or more side faces of the light transmitting element.

In accordance with another aspect, a radiation detector is provided. An array of scintillating element each have an output face and a plurality of other faces. A metamaterial covers each of the other faces. An array of solid-state light sensitive elements are optically coupled to the output faces.

In accordance with another aspect, a nuclear scanner includes a plurality of the radiation detectors and a reconstruction processor which reconstructs electrical signals generated by the light sensitive elements into an electronic image representation. An image memory stores the electronic image representation. A video processor selects portions of the stored image representation and formats them to present a human-readable display on a monitor.

In accordance with another aspect, a method of making a light device is provided. A light transmitting element is optically coupled with a light sensitive element. Surfaces of the light transmitting element are coated with a metamaterial which is configured to optimize light transmission from the light transmitting element to the light sensitive element at a frequency or frequency range of light transmitted by the light transmitting element.

In accordance with another aspect, a method of detecting radiation is provided. Radiation is converted into light of a characteristic frequency or frequency range with a scintillating element. Light of the characteristic frequency or frequency range is converted into an electrical signal with a light sensitive element optically coupled to a light output face of the scintillating element. Light which strikes surfaces of the scintillating element not coupled with the light sensitive element are totally reflected back into the scintillating element with a metamaterial configured to have an index of refraction of 1.0 or less at the characteristic frequency or frequency range.

One advantage resides in reduced light transmission losses.

Another advantage resides in greater light capture efficiency.

Still further advantages and benefits will become apparent to those of ordinary skill in the art upon reading and understanding the following detailed description.

The innovation may take form in various components and arrangements of components, and in various steps and arrangements of steps. The drawings are only for purposes of illustrating the preferred embodiments and are not to be construed as limiting.

Figure 1:
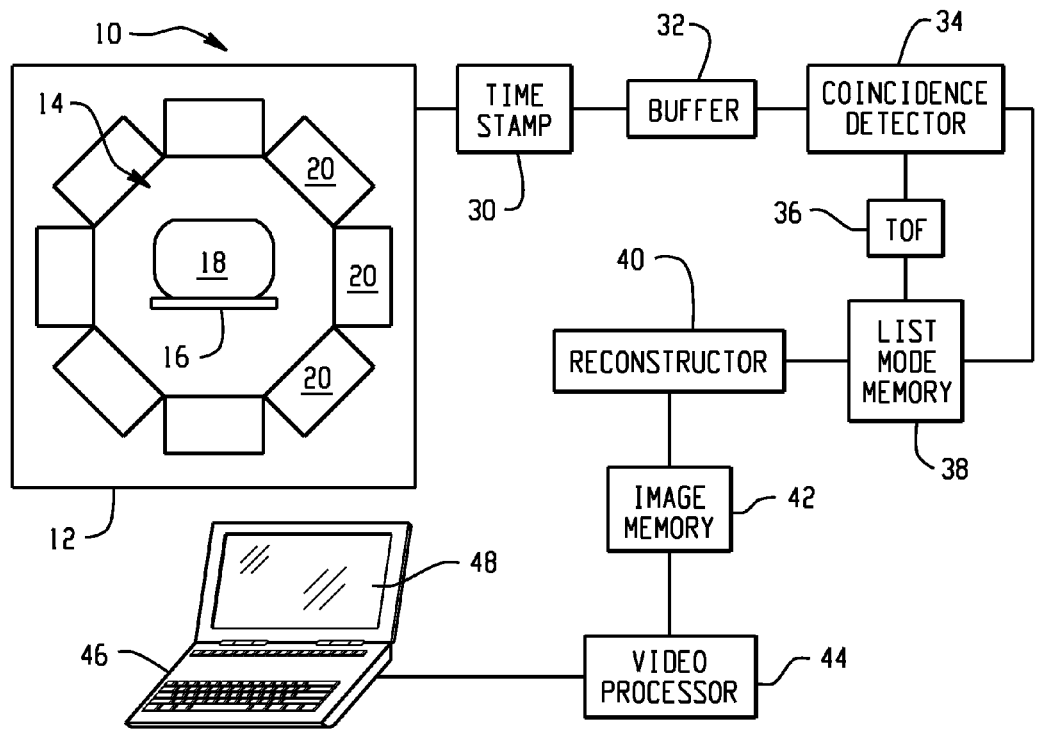
FIG. 1 is a diagrammatic illustration of nuclear imaging system, particularly a PET imaging system.

With reference to FIG. 1, a nuclear imaging system 10 includes a gantry 12 that defines an examination region 14 configured to receive a subject support 16 supporting a subject 18 to be imaged. Near the beginning of the imaging session, the subject is injected with a radioactive tracer which emits a γ-ray or the like of characteristic energy attached to a metabolic substance, e.g., glucose, or the like. The emitted γ-rays are detected by one or more radiation detector heads 20 which include one or more detector arrays 22 disposed adjacent the examination region 14. In a SPECT camera, a limited number of the detector heads are typically mounted to rotate around the subject to receive radiation emitted from the subject over at least a 180° arc and more typically 360° around the patient.

In the illustrated PET detector, each radiation decay event causes a pair of 511 keV γ-rays to be emitted in 180° opposite directions to define a line of response (LOR). In a PET imaging system, a relatively large number of detector heads are mounted, non-rotatably, 360° around the examination region 14 to detect the pair of γ-rays emitted by each radiation event. A time stamp circuit 30 labels each event with a time stamp and the time-stamped events are stored in a buffer 32. A coincidence detector 34 determines each pair of γ-rays that are associated with a corresponding common one of the radiation events and defines the corresponding LOR. In a time-offlight PET scanner (TOF-PET), a time-of-flight processor 36 further analyzes the time stamps belonging to each LOR to localize the corresponding radiation event along the LOR. Because the γ-rays travel at a known speed, the speed of light, the small time differences between the detection of each γ-ray of a corresponding pair provides localization information for localizing the radiation decay event along the LOR. The LORs, with their time-of-flight localization information, are stored in chronological order with their time stamps, i.e., in list mode, in a list mode memory or buffer 38. A reconstruction processor 40 reconstructs the LORs into an image representation which is stored in an image memory 42. A video processor 44 under control of a user interface 46 selects appropriate portions of the image data in the image memory 42 to be converted into a human-readable display on a display device 48. Typical displays include one or more slice images, projection images, surface or volume renderings, and the like.

Figure 2:
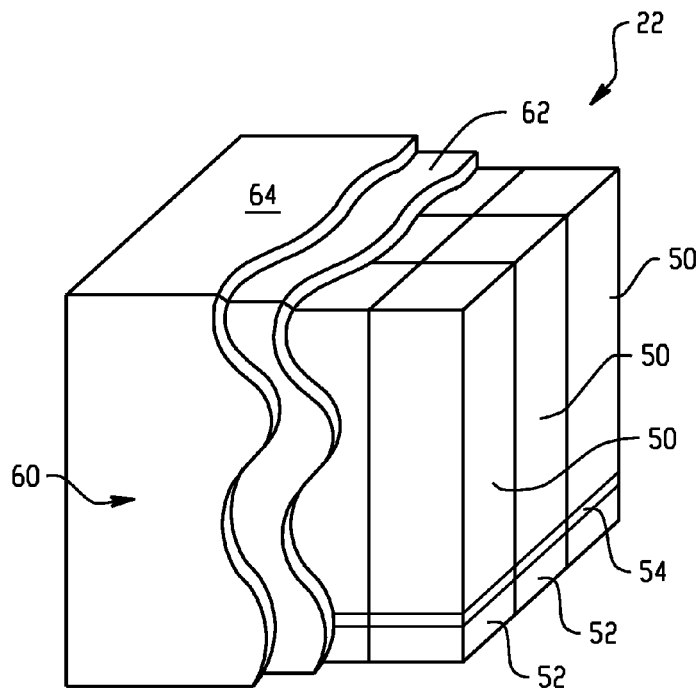
FIG. 2 is a perspective view of a portion of one of the detectors of the nuclear imaging system.

With reference to FIG. 2, each detector array 22 includes a plurality of light transmissive elements, such as scintillation elements, scintillator crystals or other scintillators 50, each of which is coupled to a light-sensitive element 52 such as a silicon photomultiplier (SiPM). An optical coupling layer 54 is disposed between the scintillators and the SiPMs to optimize light transmission. Suitable scintillators include: LYSO, LSO, LuYAP, and the like. Each scintillator has a cross-sectional area commensurate with the desired resolution, and a length commensurate with the γ-ray stopping power of the scintillation material.

Figure 3:
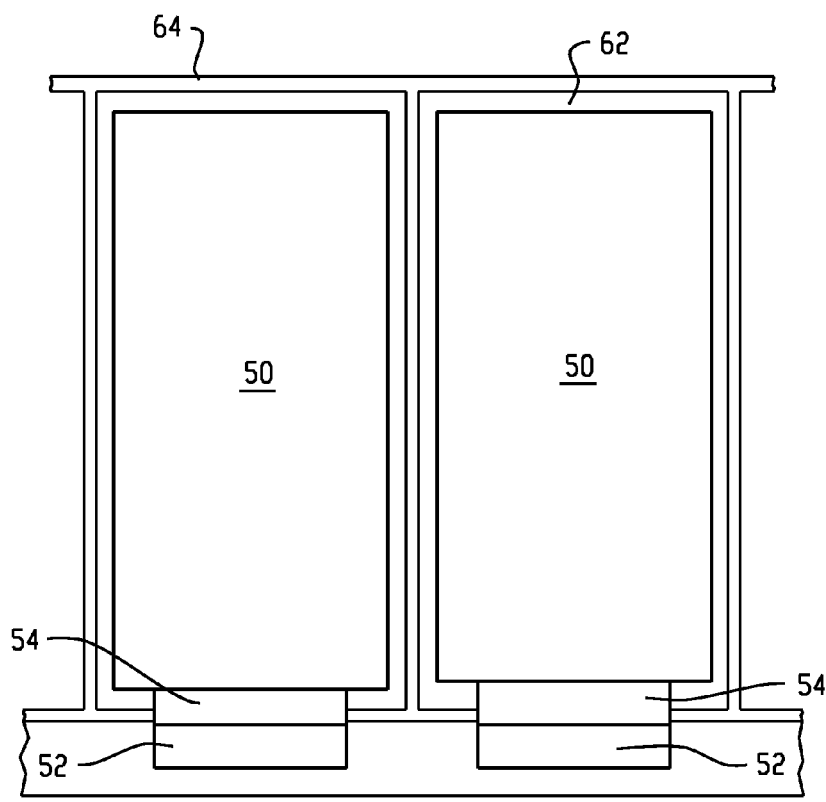
FIG. 3 is a cross-sectional view of a pair of adjacent scintillating light transmissive elements and light detectors.

With continuing reference to FIG. 2 and further reference to FIG. 3, the surfaces of each scintillator which are not optically coupled to a light sensor 52 are covered with a reflective layer 60. More specifically, the layer 60 includes an inner layer 62 with an index of refraction less than that of air, i.e., less than 1.0. In the described embodiment, the inner layer 62 includes a metamaterial or other material with an index of refraction below the index of refraction of the scintillator at least at the frequency or spectrum of light emitted by the scintillator. A lower index of refraction, particularly less than 1.0, provides more reflection. An index of refraction near zero or even a negative index of refraction improves reflection still more. A light barrier layer 64, such as a thin aluminum or other metalized layer which can be only a few nanometers thick, surrounds the inner or metamaterial layer 62, particularly on surfaces abutting another scintillation crystal in order to block cross-talk.

Many materials encountered in optics, such as glass or water, have a positive permittivity ϵ and a positive permeability μ. Metals can have a negative permittivity, i.e., they are opaque to light. Metamaterials have a permeability to permittivity ratio which results in a refractive index N which can be lower than 1 or even negative, which is not possible with conventional materials. When light travelling through the crystal approaches the interface with the metamaterial, Snell's law states:

$$N_{crystal} \sin \theta_1 = N_{meta} \sin \theta_2$$

where $N_{crystal}$ is the index of refraction of the scintillation crystal, $\theta_1$ is the angle of incidence, $N_{meta}$ is the index of refraction of the metamaterial, and $\theta_2$ is the angle of refraction.

From the above formula, the critical angle of total reflection is arcsin ($N_{meta}/N_{crystal}$). The ideal case of total reflection for all angles occurs at $N_{meta}=0$, where the critical angle is 0. Interestingly, if $N_{meta}<0$, but $>-N_{crystal}$, the critical angle becomes negative, that means that the rays bounce back at the same side of the normal. For $N_{meta}<-N_{crystal}$, the angle becomes complex. Optimally, $N_{meta}$ is as close to 0 as possible, but positive. Total reflection does not need refraction on the same side of the normal. The condition that the incidence angle is larger than the critical angle is easier to achieve as the critical angle becomes smaller.

Figure 4:
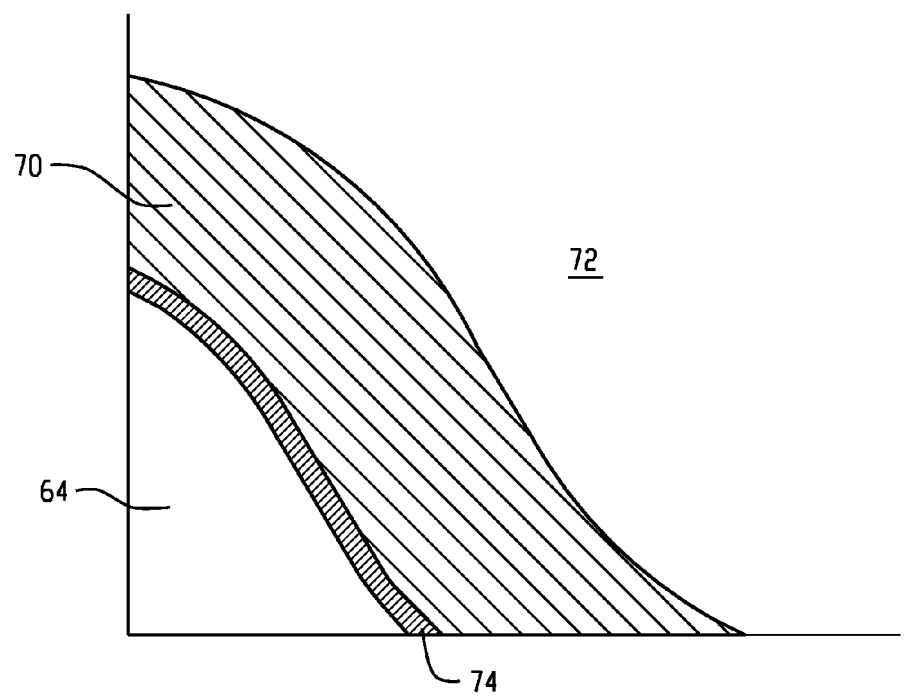
FIG. 4 is a detailed view of a scintillator surface coating construction.

With reference to FIG. 4, metamaterials gain their properties from their structure, particularly their surface structure on a scale which interacts with light from the scintillation crystal. The metamaterials include an array of metal, silicon or the like rods or fibers 70, a fraction, e.g., ¼ of the wavelength in length, that have length, diameter, width, thickness, and other characteristics selected in accordance with the frequency or frequency spectrum of the light emitted by the scintillation crystals. Scintillation crystals, each typically emit light of a characteristic frequency or frequency spectrum, often in the blue or green range, i.e., about 400-540 nm. The metamaterial is constructed with rods, whose resonant frequency matches the characteristic frequency of the selected scintillation crystal. In this manner, when the scintillation crystal light causes the silicon rods to resonate at their resonance frequency, total reflection is achieved. If any light should pass through the metamaterial, the foil layer 64 reflects the light and blocks it from passing into the next crystal.

The rods 70 are, in one embodiment, formed by plating a thin layer of a selected material, e.g., gold, silicon, or the like, on a face 72 of the scintillator. Laser etching or the like is used to cut away unwanted portions of the layer leaving the rods. Alternately, the rods can be manufactured in sheets and applied to the crystal surface.

The rods 70 in FIG. 4 are generally parallel to each other, for simplicity of illustration and manufacture. Parallel rods are most reactive with light of the corresponding polarity. Because the light generated by the scintillation crystal is typically randomly polarized, it is advantageous to have rods with different orientations. This can be achieved by laser cutting rods with a plurality of orientations, applying one or more additional layers of rods with orientations, forming a mat of randomly oriented rods, a ring structure, or the like. An oxide binder or layer 74 in one embodiment separates the rods 70 from the barrier layer 62 and each other.

At the output face of the scintillator, the optical coupling layer 54 in one embodiment includes a photonic crystal 80, preferably of a common crystalline material as the scintillator or another crystal with the same index of refraction. If the light transmitting element 50 includes a non-scintillating material doped with a scintillator, the photonic crystal can be a non-scintillating material. The photonic crystals have a periodic modulation in their dielectric constant. Photonic crystals typically are sized to about ½ the wavelength; whereas, metamaterials are sized to about a quarter wavelength or less. In the photonic crystal, it is the size of the cell that determines the properties; whereas, in the metamaterial, it is the resonator itself. In another embodiment, the optical coupling layer 54 is a metamaterial. The metamaterial controls the angular range over which light escapes the light transmitting element 50. By constraining the light to angles nearer to perpendicular to the light sensitive element face, reflection is reduced and light transmission improved.

Figure 5:
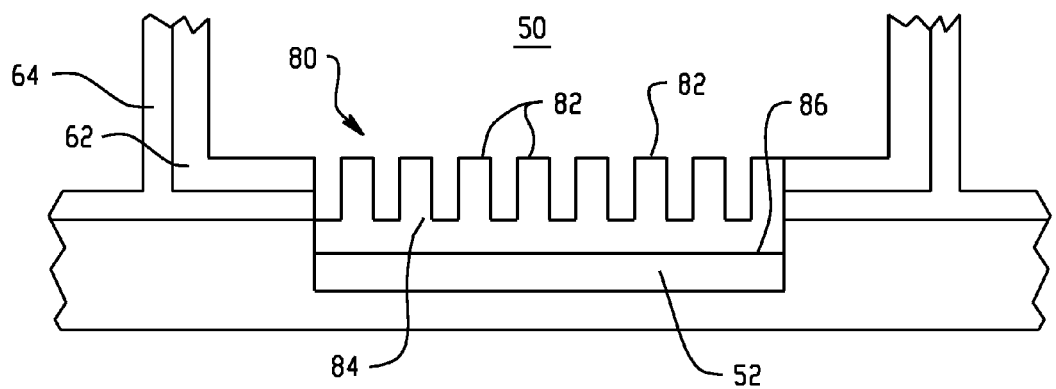
FIG. 5 is a diagrammatic illustration of a light output end of the light transmissive element; and, FIG. 6 illustrates an optic fiber embodiment.

With reference to FIG. 5, the scintillator crystal has an array or close packed grid of holes 82 that are filled with an optical coupling agent 84 that is optically matched to a light receiving face 86 of the SiPM 52, e.g., and optical coupling grease. The holes have a center to center spacing on the order of one half to one and a half times the wavelength of the light, i.e., for light in the 400-540 nm range, a center to center spacing of about 200-800 nm. The holes have a depth of about a third of the center to center spacing, e.g., about 60-300 nm.

Figure 6:
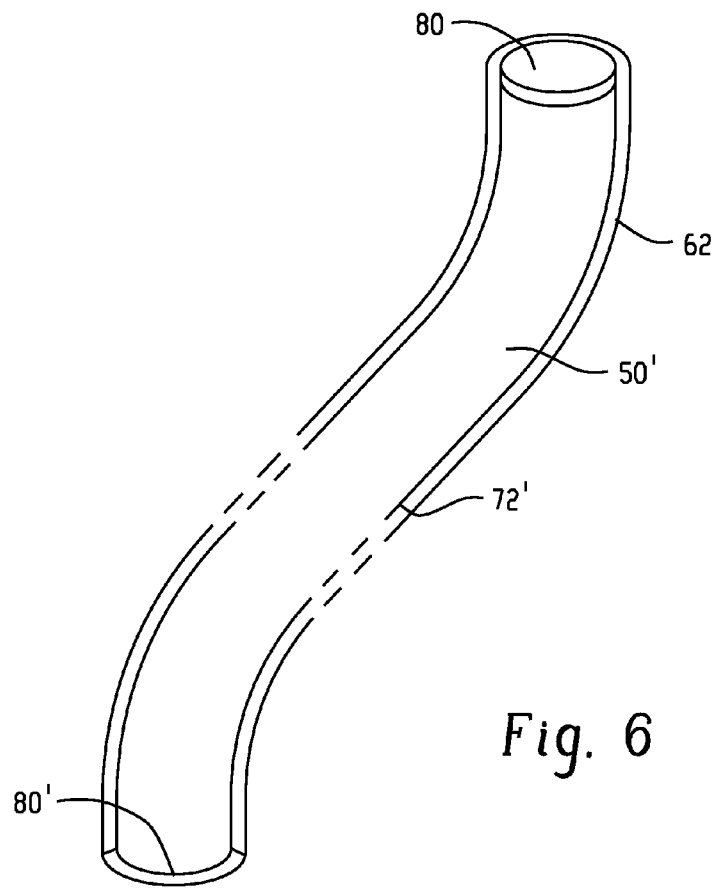

With reference to FIG. 6, rather than a scintillating light transmitting element 50, the metamaterial and/or photonic crystal layers can be applied to other light transmitting elements such as an optic fiber 50'. Side faces 72' of the optic fiber 50' are covered with the metamaterial layer 62 with rods that resonate with the frequency or frequency spectrum of the transmitted light. A photonic crystal layer 80 is defined at an output end and a similar photonic crystal 80' is defined at an input end. Optionally, the optic fiber 50' includes a scintillating material.

The invention has been described with reference to the preferred embodiments. Modifications and alterations may occur to others upon reading and understanding the preceding detailed description. It is intended that the invention be constructed as including all such modifications and alterations insofar as they come within the scope of the appended claims or the equivalents thereof.

The invention claimed is:

1. A light device including:
   a light transmitting element;
   a light-sensitive element optically coupled to an output face of the light transmitting element;
   a metamaterial having an index of refraction less than 1 disposed on one or more faces of the light transmitting element;
   a photonic crystal disposed at a light output face of the light transmitting element.

2. The light device according to claim 1, wherein the light transmitting element includes a scintillating material that converts γ-rays into light of a characteristic frequency or frequency spectrum.

3. The light device according to claim 2, further including:
   a light reflective and light blocking metal foil layer surrounding the metamaterial layer.

4. The light device according to claim 1, wherein the light-sensitive element includes a silicon photomultiplier (SiPM) optically coupled to the photonic crystal to receive light from the light transmitting element through the photonic crystal.

5. The light device according to claim 1, wherein the photonic crystal is disposed between and optically coupled to the light transmitting element and to the light-sensitive element to transfer light from the light transmitting element to the light-sensitive element.

6. The light device according to claim 5, wherein the light transmitting element includes a scintillator which scintillates with light of a characteristic wavelength and the light-sensitive element includes a photodiode and wherein the photonic crystals are sized to one half the characteristic wavelength and the metamaterial is sized to a quarter or less of the characteristic wavelength.

7. A light device comprising:
   a light transmitting element;
   a light-sensitive element optically coupled to an output face of the light transmitting element;
   a metamaterial having an index of refraction less than 1 disposed on one or more faces of the light transmitting element, the metamaterial layer including:
   a plurality of rods sized to resonate at a frequency or frequency spectrum of light transmitted by the light transmitting element.

8. The light device according to claim 7, wherein the metamaterial layer covers a surface of the light transmitting element which is optically coupled to the sensitive element.

9. The light device according to claim 7, wherein the rods are oriented in a plurality of directions to be reactive with light of a plurality of polarities.

10. A radiation detector comprising:
    an array of the light devices according to claim 9.

11. The light device according to claim 7, wherein the light transmitting element includes a scintillation crystal which generates light of the characteristic frequency or spectrum in a wavelength in the range of 400-540 nm and the rods have a length of 100-160 nm.

12. The radiation detector comprising:
    an array of scintillating light transmitting elements each having a plurality of faces including a light output face;
    a metamaterial layer covering the faces of the scintillating light transmitting elements of the array except the light output faces are covered;
    a metal foil layer disposed between the metamaterial layers of adjacent scintillating light transmitting elements to prevent optical cross-talk; and
    an array of solid state photodetectors optically coupled to the output faces of the array of scintillating light transmitting elements.

13. The radiation detector according to claim 12, wherein the scintillating light transmitting elements emit light of a characteristic wavelength and further including:
    an array of holes in the light output face of the scintillating light transmitting elements, the holes being spaced between one half and one and a half times the characteristic wavelength;
    an optical coupling agent disposed in the holes and between the light output faces and the solid-state photodetectors.

14. The radiation detector according to claim 12, wherein the metamaterial includes a plurality of layers of metamaterial to provide a plurality of polarizations.

15. The radiation detector according to claim 14, wherein each layer is cut to define parallel extending rods and the layers are applied with the rods in different orientations.

16. The radiation detector according to claim 12, wherein the foil layer is light reflective and light blocking.

17. A radiation detector including:
    an array of scintillating light transmitting element each having an output face and a plurality of other faces;
    a metamaterial covering each of the other faces;
    an array of solid-state light sensitive elements optically coupled to the output faces; and
    a metamaterial optical coupling layer optically coupled between the scintillating light transmissive elements and the solid-state light sensitive elements.

18. A nuclear scanner comprising:
    a plurality of radiation detectors according to claim 17;
    a reconstruction processor which reconstructs electrical signals generated by the light-sensitive elements into an electronic image representation;
    an image memory which stores the electronic image representation;
    a video processor which selects portions of the stored image representation and formats them to present a human-readable display on a monitor.

19. A method of making a light device comprising:
    optically coupling a light transmitting element with a light-sensitive element which transmits light of a characteristic frequency or frequency spectrum;
    coating surfaces of the light transmitting element with a metamaterial which includes a plurality of rods oriented in a plurality of directions and sized to resonate at the characteristic frequency or frequency spectrum, the metamaterial having an index of refraction less than 1 at the characteristic frequency or frequency spectrum.

20. The method according to claim 19, wherein the light transmitting element includes a scintillator which when struck by radiation emits light and further including covering the metamaterial with a metal layer.

21. A method of detecting radiation comprising:
converting radiation into light of a characteristic frequency or frequency spectrum with a scintillating element;
converting light of the characteristic frequency or frequency spectrum into an electrical signal with a light-sensitive element coupled to an output face of the scintillating element;
reflecting light which strikes surfaces of the scintillating element not optically coupled to the light-sensitive element back into the scintillating element with a metamaterial includes a plurality of rods oriented in a plurality of directions and sized to resonate at the characteristic frequency or frequency spectrum, the metamaterial being configured to have an index of refraction less than 1 at the characteristic frequency or frequency spectrum.

* * * * *